United States Patent
Sung et al.

(10) Patent No.: US 9,866,343 B1
(45) Date of Patent: Jan. 9, 2018

(54) ORTHOGONAL FREQUENCY DIVISION MULTIPLEX (OFDM) SUB-BAND ALLOCATION TO ENHANCE WIRELESS DATA COMMUNICATIONS

(71) Applicant: Sprint Communications Company L.P., Overland Park, KS (US)

(72) Inventors: Sanghoon Sung, Ashburn, VA (US); Hau V. Tran, Centreville, VA (US); Udit A. Thakore, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 351 days.

(21) Appl. No.: 14/727,974

(22) Filed: Jun. 2, 2015

(51) Int. Cl.
| | |
|---|---|
| H04L 5/00 | (2006.01) |
| H04W 72/00 | (2009.01) |
| H04J 11/00 | (2006.01) |
| H04W 72/08 | (2009.01) |

(52) U.S. Cl.
CPC .......... H04J 11/0056 (2013.01); H04L 5/006 (2013.01); H04L 5/0007 (2013.01); H04W 72/082 (2013.01); H04W 72/085 (2013.01)

(58) Field of Classification Search
CPC   H04W 72/085; H04W 72/082; H04L 5/0007; H04L 5/006; H04L 5/007
See application file for complete search history.

(56) References Cited

U.S. PATENT DOCUMENTS

| | | |
|---|---|---|
| 7,333,463 B2 | 2/2008 | Park et al. |
| 8,634,351 B2 | 1/2014 | Aue et al. |
| 8,824,272 B2 | 9/2014 | Sud |
| 2005/0201327 A1 | 9/2005 | Kim et al. |
| 2007/0242765 A1* | 10/2007 | Parizhisky ............. H04L 5/023 375/260 |
| 2013/0230013 A1* | 9/2013 | Seo ..................... H04L 27/2602 370/329 |
| 2014/0293906 A1 | 10/2014 | Chang et al. |
| 2015/0003270 A1 | 1/2015 | Jamadagni et al. |
| 2015/0009895 A1 | 1/2015 | Zhu et al. |
| 2015/0110044 A1* | 4/2015 | Berzin ............. H04W 28/0252 370/329 |
| 2016/0286404 A1* | 9/2016 | Rico Alvarino ...... H04L 5/0048 |

FOREIGN PATENT DOCUMENTS

WO    2010091713    8/2010

* cited by examiner

*Primary Examiner* — Gbemileke J Onamuti

(57) ABSTRACT

An Orthogonal Frequency Division Multiplex (OFDM) base station transfers a wideband measurement request for a wideband OFDM spectrum to User Equipment (UE). The base station receives a wideband signal metric from the UE, and if the wideband signal metric is below a threshold, the base station transfers a sub-band null request to shield a sub-band of the wideband spectrum to an adjacent base station. The base station also transfers a sub-band measurement request to the UE. The base station receives a sub-band signal metric for the shielded sub-band from the UE, and if the sub-band signal metric is above a threshold, then the base station authorizes use of the shielded sub-band for the UE. The base station receives a communication request for the UE, and in response, transfers another sub-band null request to the adjacent base station and exchanges wireless data over the shielded sub-band with the UE.

20 Claims, 7 Drawing Sheets

ORTHOGONAL FREQUENCY DIVISION MULTIPLEX (OFDM) SUB-BAND ALLOCATION TO ENHANCE WIRELESS DATA COMMUNICATIONS

TECHNICAL BACKGROUND

Wireless communication devices include phones, computers, intelligent machines, or some other apparatus with a wireless transceiver. Wireless communication networks include base stations, distributed antenna systems, or some other type of wireless access point to exchange wireless signals with the wireless communication devices. The wireless communication devices and the wireless communication networks exchange electromagnetic signals over the air to support services like mobile Internet access, audio/video streaming, user data messaging, and the like.

Some wireless communication networks and devices use Orthogonal Frequency Division Multiplexing (OFDM) to exchange wireless data. OFDM uses resource blocks of time elements and frequency elements to organize the data exchanges. The time elements are OFDM symbol times and the frequency elements are Radio Frequency (RF) subcarriers. The time/frequency combination of an OFDM symbol and an RF subcarrier is called an OFDM resource element. The resource elements are grouped into OFDM resource blocks.

The OFDM base stations have coverage sectors with boundaries between the sectors. The RF interference near sector boundaries tends higher than middle-sector interference. The interference at sector boundaries between adjacent base stations at different sites is often the most acute. The OFDM resource elements of these adjacent base stations interfere with one another, especially near the coverage boundary. This OFDM boundary interference can be significantly worse than the interference faced by other wireless communication protocols. The increased OFDM boundary interference degrades services like Voice over Long Term Evolution (VoLTE) and inhibits service deployment. Communication services like VoLTE need an improved Signal-to-Interference and Noise Ratio (SINR) at the base station boundaries to overcome the higher OFDM boundary interference.

Current techniques to control OFDM boundary interference include LTE co-channel interference processes that LTE base stations use to mitigate interference between LTE resource blocks. The LTE base stations exchange resource block interference data over an LTE X2 signaling interface. The LTE base stations use the resource block interference data to avoid using noisy resource blocks. Unfortunately, current OFDM interference mitigation is not good enough to support demanding wireless data services like VoLTE.

TECHNICAL OVERVIEW

An Orthogonal Frequency Division Multiplex (OFDM) base station transfers a wideband measurement request for a wideband OFDM spectrum to User Equipment (UE). The base station receives a wideband signal metric from the UE, and if the wideband signal metric is below a threshold, the base station transfers a sub-band null request to shield a sub-band of the wideband spectrum to an adjacent base station. The base station also transfers a sub-band measurement request to the UE. The base station receives a sub-band signal metric for the shielded sub-band from the UE, and if the sub-band signal metric is above a threshold, then the base station authorizes use of the shielded sub-band for the UE. The base station receives a communication request for the UE, and in response, transfers another sub-band null request to the adjacent base station and exchanges wireless data over the shielded sub-band with the UE.

DETAILED DESCRIPTION

Figure 1:
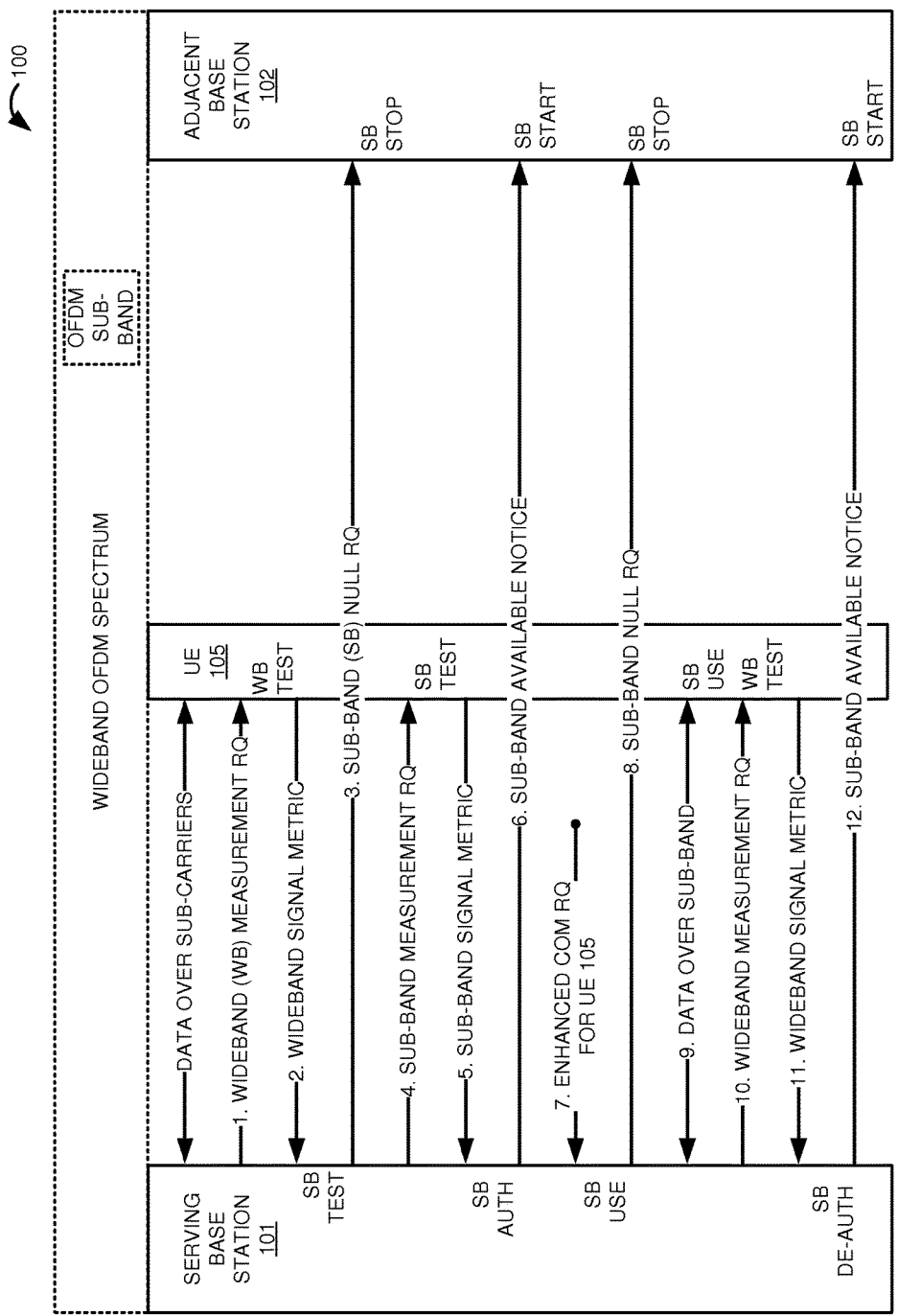
FIG. 1 illustrates an Orthogonal Frequency Division Multiplex (OFDM) communication system that allocates shielded OFDM sub-bands to enhance wireless data communications with User Equipment (UE).
Figure 2:
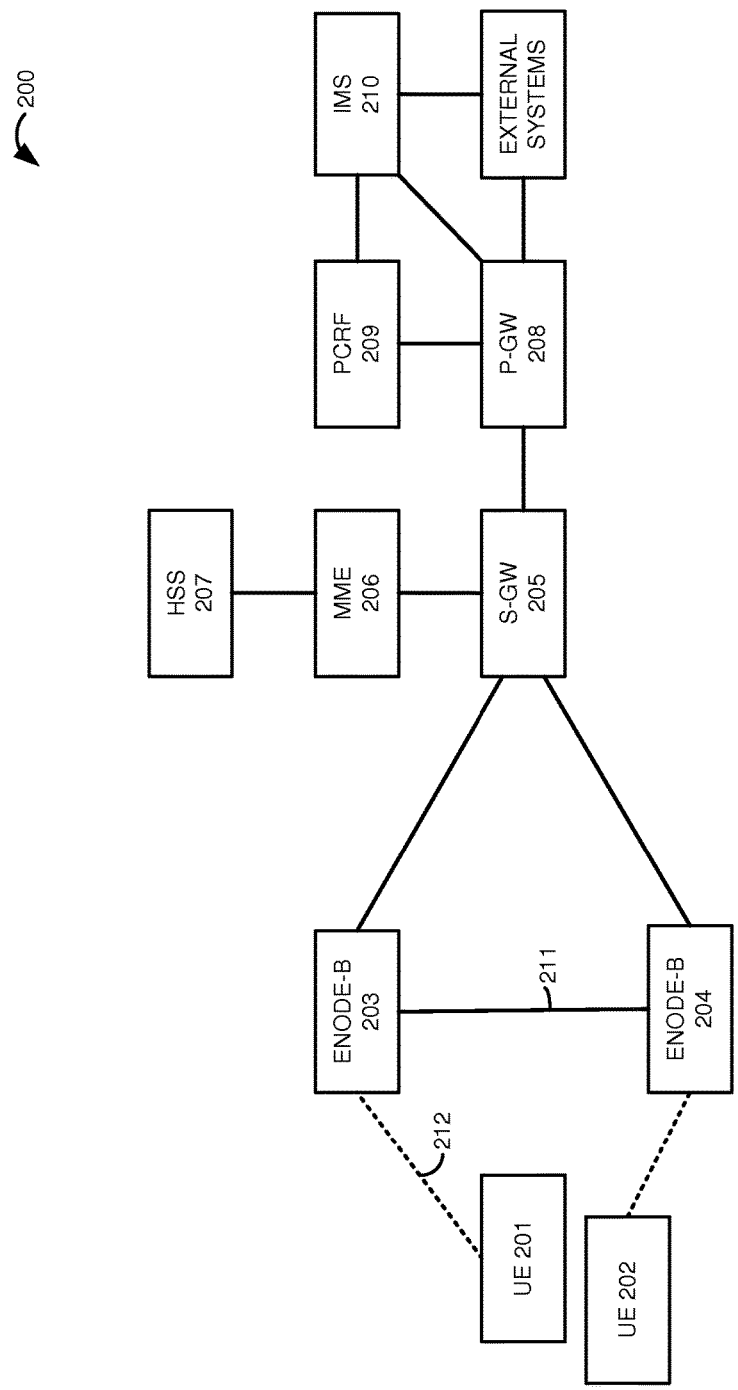
FIGS. 2-5 illustrate a Long Term Evolution (LTE) communication system that allocates shielded LTE sub-bands to enhance wireless data communications with User Equipment (UE).

FIG. 1 illustrates Orthogonal Frequency Division Multiplex (OFDM) communication system 100 that allocates shielded OFDM sub-bands to enhance wireless data communications with User Equipment (UE) 105. OFDM communication system 100 comprises serving base station 101, adjacent base station 102, and UE 105. The number of base stations has been restricted for clarity, but there are typically multiple adjacent base stations that are similar to adjacent base station 102.

OFDM base stations 101-102 comprise eNodeBs, femtocells, picocells, repeaters, or some other type of wireless base station. Base stations 101-102 include antennas, amplifiers, modulators, signal processing circuitry, memory devices, software, bus interfaces, and network interface. Adjacent base station 102 has RF coverage that overlaps with the RF coverage of serving base station 101. In some examples, base stations 101-102 are in physically adjacent cells at different physical sites. In other examples, base stations 101-102 are integrated like a picocell within a macrocell. In yet other examples, base stations 101-102 are on the same tower and serve adjacent RF coverage areas.

UE 105 comprises a phone, computer, media player, intelligent machine, or some other apparatus having an OFDM transceiver. UE 105 includes antennas, modulators, processing circuitry, memory devices, software, and bus interfaces. The processing circuitry comprises transistors, registers, and signal paths. The memory devices comprise flash drives, disc drives, read-only circuitry, or some other data storage media.

Base stations 101-102 and UE 105 exchange data over a wideband OFDM spectrum. The wideband OFDM spectrum has a Radio Frequency (RF) range of 10-100 MHz or more that is typically centered somewhere between 0.5-3.0 GHz. The wideband OFDM spectrum comprises numerous frequency sub-carriers. The frequency sub-carriers are grouped into OFDM sub-bands of the wideband OFDM spectrum. The OFDM sub-bands typically have an RF range of 200-900 KHz or less. The wideband OFDM spectrum may be a large set of resource blocks while the OFDM sub-band comprises a small sub-set of the OFDM resource blocks. The wideband OFDM spectrum may be a large band of subcarrier frequencies, and the OFDM sub-band could be a small set of these sub-carriers.

UE 105 and serving base station 101 wirelessly exchange data over various subcarriers in the wideband spectrum. Typically, serving base station 101 assigns a stream of uplink and downlink resource blocks to support the data exchange. The assigned resource blocks might be 12 subcarriers each and are selected from various parts of the wideband OFDM spectrum. The procedure for using an enhanced sub-band service is now described.

In process number 1, serving base station 101 transfers a wideband measurement request for the wideband OFDM spectrum to UE 105. The wideband measurement request is triggered by: data service invocation, OFDM network attachment, RF power loss from UE 105, time period, noise level, or some other networking factor. In response to the wideband measurement request, UE 105 measures the RF signal power from serving base station 101 across the entire wideband OFDM spectrum. UE 105 uses a band-pass filter for the wideband RF measurement that passes RF energy from all of the subcarriers in the wideband OFDM spectrum and that blocks the RF energy outside of the wideband OFDM spectrum.

In process number 2, UE 105 transfers a wideband signal metric for the wideband OFDM spectrum to serving base station 101. The wideband signal metric is typically received RF power, but other metrics may be included such as signal-to-interference and noise, channel quality, and the like. Serving base station 101 processes the wideband signal metric to determine if a sub-band measurement should be taken by UE 105. For example, the reported RF power of the wideband OFDM spectrum at UE 105 may drop below a threshold for the enhanced sub-band service. In this example, the low wideband signal metric triggers a sub-band measurement.

In process number 3 and responsive to the low wideband signal metric, serving base station 101 transfers a sub-band null request to adjacent base station 102. The sub-band null request is for a specific OFDM sub-band of the wideband OFDM spectrum. The sub-band null request may traverse an OFDM X2 link between base stations 101-102. Serving base station 101 may also transfer similar sub-band null requests to other adjacent base stations. In response to the sub-band null request, adjacent base station 102 inhibits or stops use the specific OFDM sub-band of the wideband OFDM spectrum—as do any other adjacent base station receiving a similar null request.

In process number 4 and responsive to the low wideband signal metric, serving base station 101 transfers a sub-band measurement request to UE 105. The sub-band measurement request is for the OFDM sub-band of the wideband OFDM spectrum. In response to the sub-band measurement request, UE 105 measures the RF signal power from serving base station 101 across only the sub-band of the wideband OFDM spectrum. UE 105 uses a band-pass filter for the sub-band RF measurement that passes energy from the all of the subcarriers in the OFDM sub-band and that blocks RF energy outside of the OFDM sub-band.

In process number 5, UE 105 transfers a sub-band signal metric for the sub-band OFDM spectrum to serving base station 101. The sub-band signal metric is typically received RF power, but other metrics may be included such as signal-to-interference and noise, channel quality, and the like. Serving base station 101 processes the sub-band signal metric to determine if the enhanced sub-band service should be authorized. For example, UE 105 may report an RF sub-band power that exceeds the requirement for a video conference service. In this example, the reported sub-band signal metric is above the sub-band threshold to authorize the enhanced sub-band service.

In process number 6 and responsive to the sub-band service authorization for UE 105, serving base station 101 transfers a sub-band available request for the OFDM sub-band to adjacent base station 102. In some examples, the sub-band available request traverses the OFDM X2 link between base stations 101-102. Serving base station 101 may also transfer similar sub-band available requests to other adjacent base stations. In response to the sub-band available request, adjacent base station 102 uses the OFDM sub-band of the wideband OFDM spectrum again—as do any other adjacent base station receiving a similar sub-band available request.

In process number 7, serving base station 101 receives an enhanced communication request for UE 105. The enhanced communication request may come from UE 105 or another system. For example, the enhanced communication request may be a signaling message from a network gateway to add a Quality-of-Service Class Indicator one (QCI 1) data bearer for UE 105. The enhanced communication request might be for a QCI 2 or QCI 3 data bearer in other cases. Likewise, the enhanced communication request may be a signaling message from UE 105 to serving base station 101 that accepts the QCI 1, QCI 2, or QCI 3 data bearer.

In process number 8 and responsive to the enhanced communication request, serving base station 101 transfers another sub-band null request for the specific OFDM sub-band of the wideband OFDM spectrum to adjacent base station 102. The sub-band null request may traverse the X2 link between base stations 101-102. Serving base station 101 may also transfer similar sub-band null requests to other adjacent base stations. In response to the sub-band null request, adjacent base station 102 inhibits or stops use the specific OFDM sub-band of the wideband OFDM spectrum—as do any other adjacent base station receiving a similar null request.

In process number 9 and responsive to the enhanced communication request, serving base station 101 exchanges wireless data over the specific OFDM sub-band with UE 105. For example, serving base station 101 may schedule resource blocks of OFDM subcarriers to UE 105 that are within the sub-band. Thus, the OFDM subcarriers allocated to UE 105 by serving base station 101 are not used by adjacent base station 102—and perhaps not by other adjacent base stations. This protective shielding of the OFDM subcarriers in the sub-band increases the Signal-to-Interference and Noise Ratio (SINR) for UE 105, and the improved SINR results in an enhanced data service for UE 105.

The following processes 10-12 describe a transition from the enhanced sub-band service back to the wideband service during the data session. Alternatively, serving base station 101 may detect that the enhanced data session has ended— perhaps by using a bearer dormancy timer—and in response to session termination, serving base station 101 would transfer a sub-band available request for the specific OFDM sub-band to adjacent base station 102 and to any other applicable base stations. If another enhanced communication request is received for UE 105, then the procedure returns to process number 7. Thus, UE 105 use of the shielded sub-band may be toggled on and off as UE 105 engages in enhanced communication sessions to allow others to use the sub-band.

In process number 10, serving base station 101 UE 105 transfers another wideband measurement request for the wideband OFDM spectrum to UE 105. The wideband measurement may be triggered by a rise in RF power from UE 105, UE service termination, time period, network attachment, noise level, or some other trigger. For example, serving base station 101 may detect that received RF power from UE 105 is high enough to return to the initial wideband service. In response to the wideband measurement request, UE 105 measures the RF signal power from serving base station 101 across the entire wideband OFDM spectrum. The wideband RF measurement requires a widening of the bandpass filter in UE 105 from the spectrum used for the sub-band RF measurement.

In process number 11, UE 105 transfers another wideband signal metric for the wideband OFDM spectrum to serving base station 101. The wideband signal metric is typically received RF power, but other metrics may be included such as signal-to-interference/noise, channel quality, and the like. Serving base station 101 processes the wideband signal metric to determine if the entire wideband OFDM spectrum may be used for UE 105. For example, the reported RF power of the wideband OFDM spectrum at UE 105 may now be high enough to stop use of the enhanced sub-band service. In this example, the second reported wideband signal metric is above the threshold for UE 105 to use the wideband OFDM spectrum. As a result, serving base station 101 de-authorizes UE 105 from the enhanced sub-band service.

In process number 12 and responsive to the de-authorization, serving base station 101 transfers a sub-band available request for the OFDM sub-band to adjacent base station 102. The sub-band available request may traverse an OFDM X2 link between base stations 101-102. Serving base station 101 may transfer similar sub-band available requests to other adjacent base stations. In response to the sub-band available request, adjacent base station 102 (and others) use the specific OFDM sub-band of the wideband OFDM spectrum.

FIGS. 2-5 illustrate Long Term Evolution (LTE) communication system 200 that allocates shielded LTE sub-bands to enhance wireless data communications with User Equipment (UE) 201. LTE communication system 200 comprises UEs 201-202, Evolved Node-Bs (eNBs) 203-204, Serving Gateway (S-GW) 205, Mobility Management Entity (MME) 206, Home Subscriber System (HSS) 207, Packet Data Network Gateway (P-GW) 208, Policy Charging Rules Function (PCRF) 209, and Internet Multimedia Subsystem (IMS) 210. eNBs 203-204 communicate over LTE X2 link 211. UE 201 and eNB 203 communicate over wireless LTE link 212.

Figure 3:
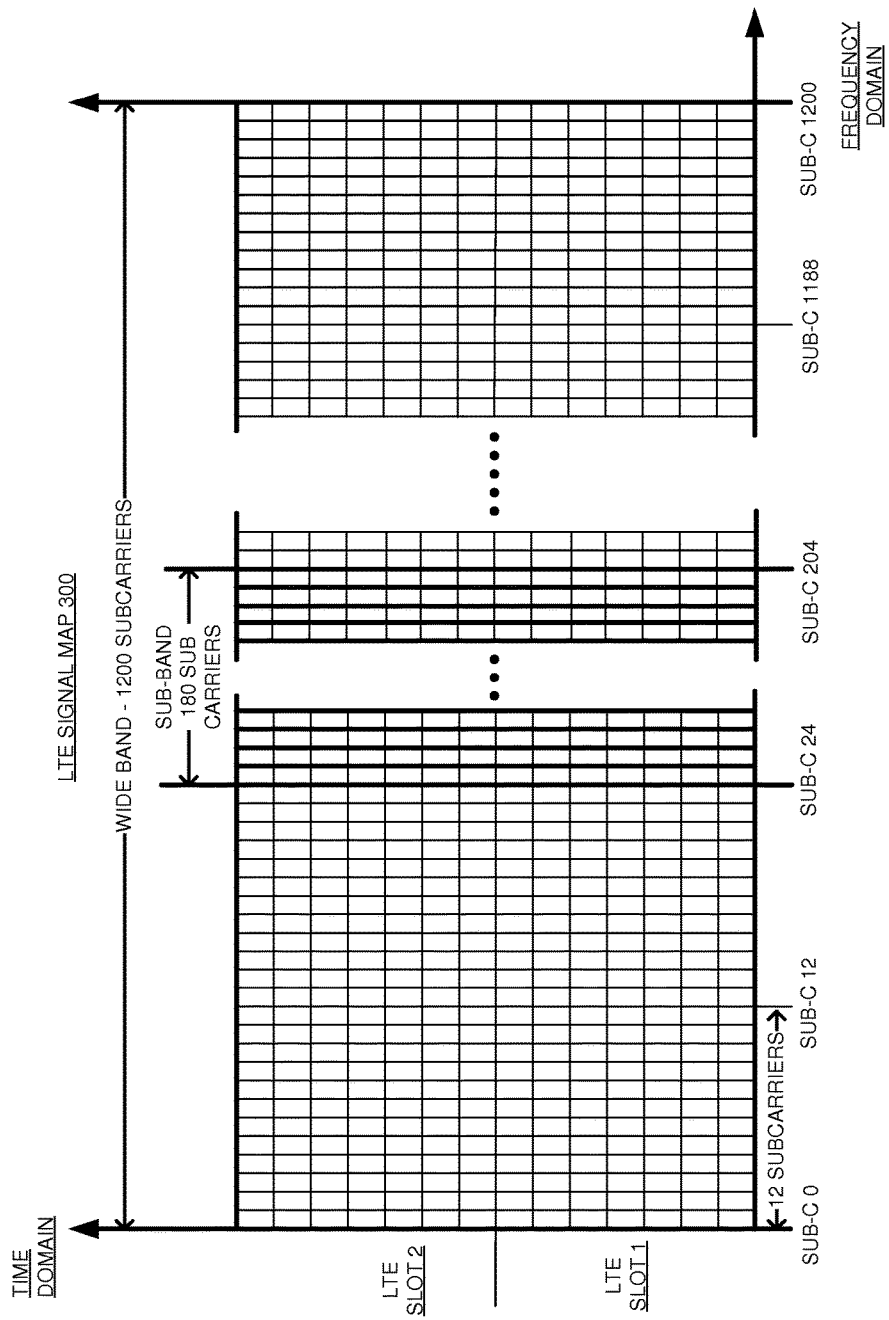
Figure 4:
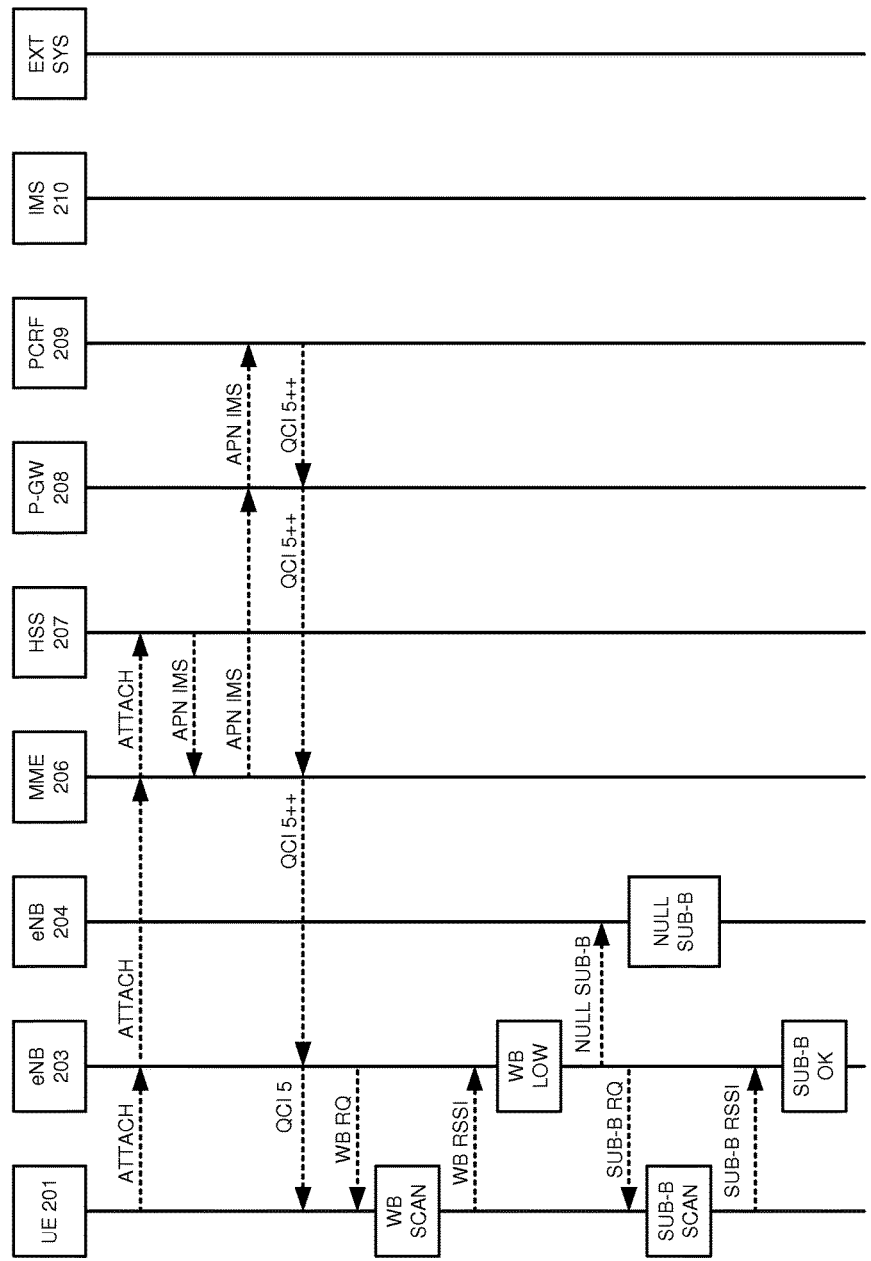

FIG. 3 shows LTE signal map 300 that is used by UEs 201-202 and eNBs 203-204 to transfer wireless data. LTE signal map 300 has a horizontal frequency domain axis and a vertical time domain axis. The time domain axis is separated into time slots one and two that repeat up the time axis. Each time slot is separated into seven OFDM symbol time periods. Each time slot is one LTE resource block long.

The frequency domain axis is separated into OFDM subcarrier frequencies from subcarrier 0 to subcarrier 1200. These 1200 OFDM subcarrier frequencies comprise the wideband spectrum that is typically centered somewhere between 0.5 and 3 GHz. This exemplary wideband spectrum is 100 LTE resource blocks wide (20 MHz). LTE signal map 300 has an LTE sub-band from subcarriers 24-204. This exemplary sub-band of 180 subcarriers is 15 LTE resource blocks wide (3 MHz). Other wideband and sub-band sizes could be used.

UE 105 attaches to serving eNB 203 using resource blocks of subcarriers somewhere in the wideband spectrum. Serving eNB 203 transfers a UE attachment message to MME 206 (note that S-GW 205 remains but is omitted from the discussion for clarity). MME 206 enters HSS 207 with an International Mobile Subscriber Identity (IMSI) for UE 201 and obtains an Access Point Name (APN) "IMS" for UE 201. The APN IMS indicates a Voice over LTE (VoLTE) capable UE. MME 206 transfers the APN IMS and the IMSI for UE 201 to P-GW 208. P-GW 208 transfers the APN IMS and IMSI for UE 201 to PCRF 209. PCRF 209 translates the APN IMS and the IMSI for UE 201 into a QCI 5++ bearer request, where the "++" indicates an availability of a shielded sub-band service for UE 201. PCRF 209 transfers a QCI 5++ bearer request for UE 201 to P-GW 208, and P-GW 208 transfers the QCI 5++ bearer request to MME 204. MME 204 transfers the QCI 5++ bearer request to serving eNB 203.

Serving eNB 203 transfers a QCI 5 bearer request and a wideband measurement request to UE 201 responsive to the attachment and the availability of the shielded sub-band service for UE 201. UE 201 scans for the RF signal power from serving eNB 203 across the entire wideband LTE spectrum. Thus, UE 201 measures the RF energy of LTE subcarriers 0-1200. UE 201 returns the wideband Received Signal Strength Indicator (RSSI) to eNB 203 and may also include Reference Signal Receive Power (RSRP), Reference Signal Receive Quality (RSRQ), Channel Quality Index (CQI), Signal-to-Interference and Noise Ratio (SINR), and/or some other RF metrics.

Serving eNB 203 compares the wideband RSSI for UE 201 to a sub-band service threshold, and in this example, the wideband RSSI is lower than the threshold. In response to the low wideband RSSI and the availability of the shielded sub-band service for UE 201, eNB transfers a null request for the sub-band (subcarriers 24-204) over the X2 interface to adjacent eNB 204. In response, eNB 204 avoids using the sub-band (subcarriers 24-204). Also in response to the low wideband RSSI and the sub-band service availability, eNB transfers sub-band measurement request for the sub-band (subcarriers 24-204) to UE 201. In response to the sub-band measurement request, UE 201 scans for the RF signal power from serving eNB 203 across the shielded LTE sub-band. Thus, UE 201 measures the RF energy of shielded LTE subcarriers 24-204. UE 201 returns the shielded sub-band RSSI to eNB 203 and may also include shielded sub-band RSRP, RSRQ, CQI, SINR, and/or some other RF metrics. Serving eNB 203 compares the shielded sub-band RSSI for UE 201 to a sub-band service threshold, and in this example, the sub-band RSSI is high enough to qualify for the enhanced sub-band service. Thus, shielded subcarriers 24-204 are OK for the enhanced wireless data service for UE 102.

Figure 5:
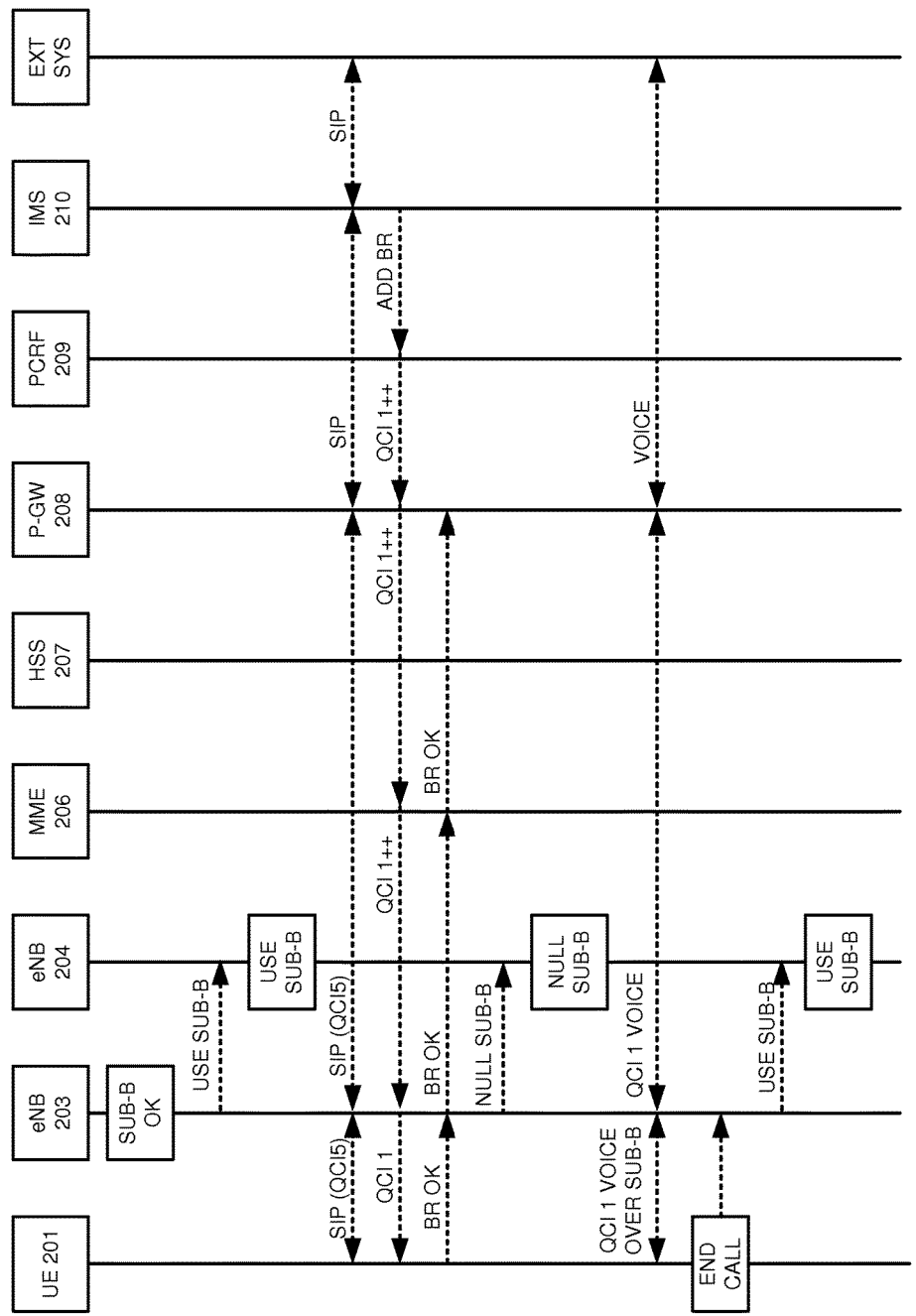

Referring to FIG. 5, the prior sub-band "OK" assessment by eNB 203 is shown again for reference. When eNB completes the sub-band assessment for UE 201 and if UE 201 has not already initiated an enhanced data session, then eNB 203 transfers a sub-band "available for use" indication over the X2 to adjacent eNB 204. In response, eNB 204 may start using LTE subcarriers 20-204 again—perhaps for UE 202.

Note that the above process is also performed for other UEs that attach to serving eNB 203. Initially, the UEs are classified by HSS 207 and PCRF 209 into UEs with access to the shielded sub-band service and UEs without access to the service. For the UEs that have access to the shielded sub-band service, serving eNB 203 classifies these UEs into three groups: 1) UEs with good wideband RSSI that do not need the shielded sub-band service, 2) UEs with poor wideband RSSI but adequate sub-band RSSI to use the shielded sub-band service, and 3) UEs with poor wideband RSSI and poor sub-band RSSI that cannot effectively use the shielded sub-band service. Typically, UE's in the first "good wideband RF" group do not use the shielded sub-band. UE's in the third group with poor wideband and sub-band RF would use an alternative communication network, such as Wireless Fidelity (WiFi) or Circuit Switched Fallback (CSFB). A timer could be used by applicable UEs and eNBs to periodically refresh the wideband and sub-band measurements and to re-classify the UEs for subsequent data communications services.

Eventually, UE 201 and IMS 210 exchange Session Initiation Protocol (SIP) signaling over the QCI 5 bearer through eNB 203 and P-GW 208. IMS 210 also exchanges SIP signaling with external systems. In response to the SIP session, IMS transfers an add voice bearer request to PCRF 209 for UE 201.

PCRF 209 translates the add voice bearer request for UE 201 into a QCI 1++ bearer request, where the "++" indicates an availability of the shielded sub-band service for UE 201. PCRF 209 transfers a QCI 1++ bearer request for UE 201 to P-GW 208, and P-GW 208 transfers the QCI 1++ bearer request to MME 204. MME 204 transfers the QCI 1++ bearer request to serving eNB 203. Serving eNB 203 transfers a QCI 1 bearer request to UE 201. UE 201 accepts the QCI 1 bearer from eNB 203, and the acceptance is passed to MME 206 and P-GW 208.

In response to the acceptance of the QCI 1 bearer by UE 201, eNB transfers a null request to shield the sub-band (subcarriers 24-204) over the X2 interface to adjacent eNB 204. In response, eNB 204 avoids using the sub-band (subcarriers 24-204). UE 201 and serving eNB 203 then exchange voice data over the QCI 1 bearer using the shielded subcarriers 24-204 to implement the enhanced wireless data service. Thus, eNB 203 schedules UE 201 in LTE resource blocks that use shielded subcarriers 20-204. Serving eNB 203 exchanges the voice data with P-GW 208 over the QCI 1 bearer. P-GW 208 exchanges the voice data with external systems to complete to voice call. The protective shielding of LTE subcarriers 20-204 increases the SINR for UE 201, and the improved SINR increases voice call quality for UE 201.

In this example, UE 201 terminates the voice call before a transition back to the wideband service occurs. In other examples, the process on FIG. 1 may be followed to transition UE 201 back to the wideband service during the voice call. Serving eNB 203 detects call termination (the dormant QCI 1) for UE 203 and transfers a sub-band "available for use" indication over the X2 to adjacent eNB 204. In response, eNB 204 may start using LTE subcarriers 20-204 again—perhaps for UE 202. If another QCI 1 bearer is accepted by UE 105, then serving eNB 203 again shields the sub-band. Thus, UE 201 use of the shielded sub-band is toggled on and off as UE 105 engages in voice calls, and other UEs may use the sub-band at during off times.

The above procedure could also be used for QCI 2, QCI 3, and/or other LTE data bearers. Note that only one sub-band was depicted above for clarity, but multiple sub-bands could be used. Each of the sub-bands would have its own subcarrier group ID for easy communication among eNBs. In these examples, the UE and eNBs may perform a series of sub-band shielding and measurement tests to select the best one of the shielded sub-bands for the UE.

Figure 6:
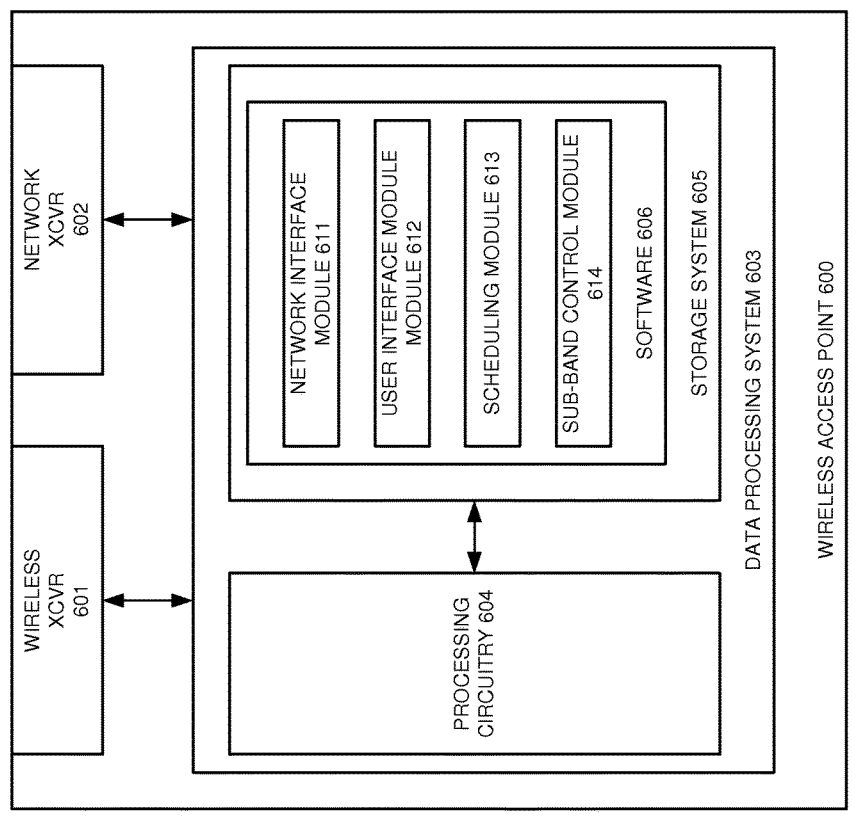
FIG. 6 illustrates a wireless access point that allocates shielded OFDM sub-bands to wireless communication devices.

FIG. 6 illustrates wireless access point 600 that allocates shielded OFDM sub-bands to wireless communication devices. Wireless access point 600 comprises wireless transceiver 601, network transceiver 602, and data processing system 603. Wireless access point 600 is an example of base stations 101-102 and eNBs 203-204, although these systems may use alternative configurations and operations. Some conventional aspects of wireless access point 600 are omitted for clarity, such as power supplies, enclosures, and the like. Wireless access point 600 may be centralized in a single unit or distributed across multiple components.

Wireless transceiver 601 comprises antennas, amplifiers, filters, circuitry, digital signal processors, memory devices, wireless protocol software, bus interfaces, and the like. Network transceiver 602 comprises layer two ports, circuitry, processing circuitry, memory devices, networking software, bus interfaces, and the like. Wireless transceiver 601 exchanges wireless signals using/avoiding shielded sub-bands as described herein. Network transceiver 602 exchanges network signaling indicating the sub-bands to use or avoid as described herein.

Data processing system 603 comprises processing circuitry 604 and storage system 605. Storage system 605 stores software 606. Software 606 includes software modules 611-614. Processing circuitry 604 comprises server blades, backplanes, bus interfaces, integrated circuitry, and associated electronics. Storage system 605 comprises non-transitory, machine-readable, data storage media, such as flash drives, disc drives, memory circuitry, tape drives, servers, and the like. Software 606 comprises machine-readable instructions that control the operation of processing circuitry 604 when executed. Software 606 includes software modules 611-614 and may also include operating systems, applications, data structures, virtual machines, utilities, databases, and the like. All or portions of software 606 may be externally stored on one or more storage media, such as circuitry, discs, tape, and the like.

When executed by processing circuitry 604, network interface module 611 directs circuitry 604 to exchange user data and network signaling with OFDM network elements to implement shielded sub-carriers for qualifying devices. When executed by processing circuitry 604, user interface module 612 directs circuitry 604 to exchange user data and network signaling with the wireless communication devices to implement the shielded sub-carriers. When executed by processing circuitry 604, scheduling module 613 directs circuitry 604 to schedule qualifying devices in shielded sub-bands or to avoid the shielded sub-bands of other access points. When executed by processing circuitry 604, sub-band control module 614 directs circuitry 604 to process the wideband and sub-band measurements to classify wireless communication devices into groups for wideband service, shielded sub-band service, or neither.

Figure 7:
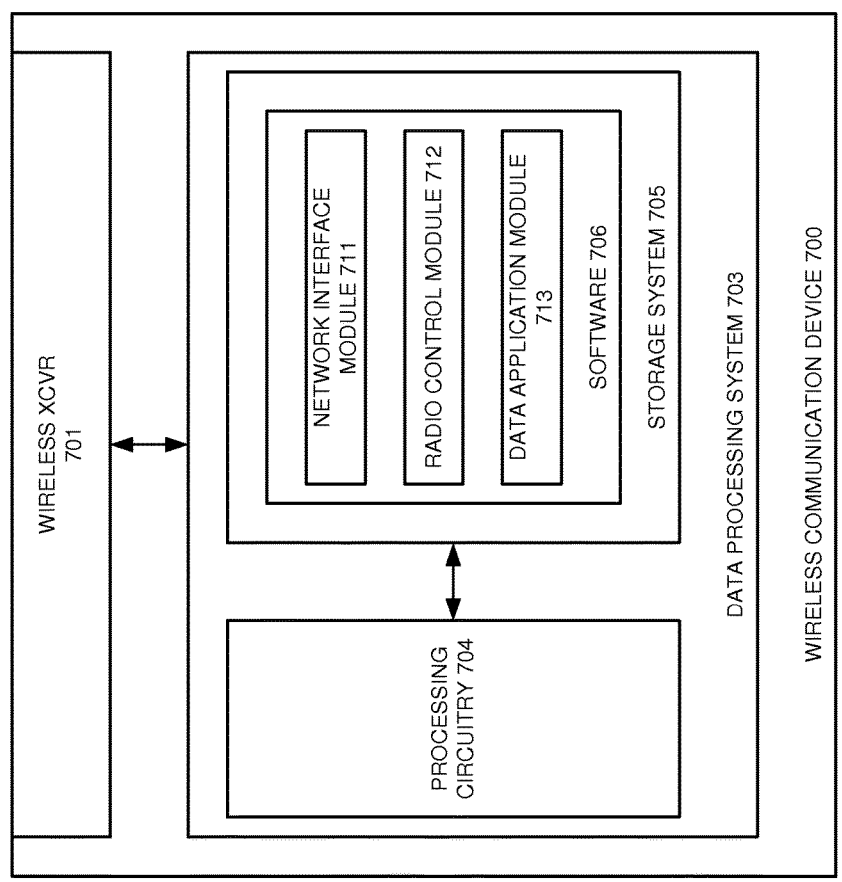
FIG. 7 illustrates a wireless communication device that uses shielded OFDM sub-bands to communicate with wireless access points.

FIG. 7 illustrates a wireless communication device that uses shielded OFDM sub-bands to communicate with wireless access points. Wireless communication device 700 comprises wireless transceiver 701 and data processing system 703. Wireless communication device 700 is an example of UEs 105 and 201, although these devices may use alternative configurations and operations. Some conventional aspects of wireless communication device 700 are omitted for clarity, such as user interfaces, power supplies, enclosures, and the like. Wireless communication device 700 may be centralized in a single unit or distributed across multiple components.

Wireless transceiver 701 comprises antennas, amplifiers, filters, circuitry, digital signal processors, memory devices, wireless protocol software, bus interfaces, and the like. Wireless transceiver 701 measures and communicates over shielded sub-bands as described herein. In particular, wireless transceiver 701 manipulates its filtering to perform both wideband and sub-band measurements.

Data processing system 703 comprises processing circuitry 704 and storage system 705. Storage system 705 stores software 706. Software 706 includes software modules 711-713. Processing circuitry 704 comprises circuit boards, bus interfaces and connections, integrated circuitry, and associated electronics. Storage system 705 comprises non-transitory, machine-readable, data storage media, such as flash drives, disc drives, memory circuitry, tape drives, servers, and the like. Software 706 comprises machine-readable instructions that control the operation of processing circuitry 704 when executed. Software 706 includes software modules 711-713 and may also include operating systems, applications, data structures, virtual machines, utilities, databases, and the like. All or portions of software 706 may be externally stored on one or more storage media, such as circuitry, discs, tape, and the like.

When executed by processing circuitry 704, network interface module 711 directs circuitry 704 to exchange user data and network signaling with the wireless access points to test and use shielded sub-carriers. When executed by processing circuitry 704, radio control module 712 directs circuitry 704 to direct transceiver 701 to perform wideband and sub-band RF signal strength measurements. When executed by processing circuitry 704, data application 713 directs circuitry 704 to exchange data with external systems over wireless transceiver 701.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an Orthogonal Frequency Division Multiplex (OFDM) communication system comprising:
    a serving base station transferring a wideband measurement request for a wideband OFDM spectrum to a User Equipment (UE);
    the serving base station receiving a wideband signal metric for the wideband OFDM spectrum from the UE, and if the wideband signal metric is below a wideband threshold, then transferring a sub-band null request to shield an OFDM sub-band of the wideband OFDM spectrum to an adjacent base station and transferring a sub-band measurement request for the OFDM sub-band to the UE;
    the serving base station receiving a sub-band signal metric for the shielded OFDM sub-band from the UE, and if the sub-band signal metric is above a sub-band threshold, then authorizing enhanced use of the shielded OFDM sub-band for the UE; and
    receiving an enhanced communication request for the UE, and in response, transferring another sub-band null request for the OFDM sub-band to the adjacent base station and exchanging wireless data over the shielded OFDM sub-band with the UE.

2. The method of claim 1 wherein the wideband OFDM spectrum comprises a set of OFDM resource blocks and the shielded OFDM sub-band comprises a sub-set of the set of the OFDM resource blocks.

3. The method of claim 1 wherein the wideband OFDM spectrum comprises a band of subcarrier frequencies and the shielded OFDM sub-band comprises a set of the subcarrier frequencies.

4. The method of claim 1 wherein the enhanced communication request for the UE comprise a request for a Quality-of-Service Class Indicator one (QCI 1) data bearer.

5. The method of claim 1 wherein the enhanced communication request for the UE comprise a request for a Quality-of-Service Class Indicator two (QCI 2) data bearer.

6. The method of claim 1 wherein the enhanced communication request for the UE comprise a request for a Quality-of-Service Class Indicator three (QCI 3) data bearer.

7. The method of claim 1 wherein the enhanced communication request for the UE comprises enhanced bearer requirements for the UE determined by a Policy Charging and Rules Function (PCRF).

8. The method of claim 1 further comprising the serving base station transferring a sub-band available notice to the adjacent base station in response to receiving the sub-band signal metric.

9. The method of claim 1 further comprising the serving base station transferring a sub-band available notice to the adjacent base station in response to a termination of the wireless data exchange over the shielded OFDM sub-band with the UE.

10. The method of claim 1 further comprising the serving base station transferring another wideband RF signal measurement request for the wideband OFDM spectrum to the UE in response to a termination of the wireless data exchange over the shielded OFDM sub-band with the UE.

11. An Orthogonal Frequency Division Multiplex (OFDM) communication system comprising:
    a serving base station configured to transfer a wideband measurement request for a wideband OFDM spectrum to User Equipment (UE), receive a wideband signal metric for the wideband OFDM spectrum from the UE and if the wideband signal metric is below a wideband threshold then transfer a sub-band null request to shield an OFDM sub-band of the wideband OFDM spectrum, transfer a sub-band measurement request for the OFDM sub-band to the UE, receive a sub-band signal metric for the shielded OFDM sub-band from the UE and if the sub-band signal metric is above a sub-band threshold then authorize enhanced use of the shielded OFDM sub-band for the UE, receive an enhanced communication request for the UE and in response transfer another sub-band null request for the OFDM sub-band, and exchange wireless data over the shielded OFDM sub-band with the UE; and
    an adjacent base station configured to avoid use of the OFDM sub-band responsive to the sub-band null requests.

12. The OFDM communication system of claim 11 method of claim 1 wherein the serving base station is configured to transfer a sub-band available notice to the adjacent base station in response to receiving the sub-band signal metric.

13. The OFDM communication system of claim 11 method of claim 1 wherein the serving base station is configured to transfer a sub-band available notice to the adjacent base station in response to a termination of the wireless data exchange over the shielded OFDM sub-band with the UE.

14. The OFDM communication system of claim 11 method of claim 1 wherein the serving base station is configured to transfer another wideband RF signal measurement request for the wideband OFDM spectrum to the UE in response to a termination of the wireless data exchange over the shielded OFDM sub-band with the UE.

15. The OFDM communication system of claim 11 method of claim 1 wherein the enhanced communication request for the UE comprises enhanced bearer requirements determined for the UE by a Policy Charging and Rules Function (PCRF).

16. The OFDM communication system of claim 11 wherein the wideband OFDM spectrum comprises a set of OFDM resource blocks and the shielded OFDM sub-band comprises a sub-set of the set of the OFDM resource blocks.

17. The OFDM communication system of claim 11 wherein the wideband OFDM spectrum comprises a band of subcarrier frequencies and the shielded OFDM sub-band comprises a set of the subcarrier frequencies.

18. The OFDM communication system of claim 11 wherein the enhanced communication request for the UE comprise a request for a Quality-of-Service Class Indicator one (QCI 1) data bearer.

19. The OFDM communication system of claim 11 wherein the enhanced communication request for the UE comprise a request for a Quality-of-Service Class Indicator two (QCI 2) data bearer.

20. The OFDM communication system of claim 11 wherein the enhanced communication request for the UE comprise a request for a Quality-of-Service Class Indicator three (QCI 3) data bearer.

* * * * *